US009069065B1

(12) United States Patent
Coley et al.

(10) Patent No.: US 9,069,065 B1
(45) Date of Patent: Jun. 30, 2015

(54) AUDIO SOURCE LOCALIZATION

(75) Inventors: Christopher D. Coley, Morgan Hill, CA (US); Ramy S. Sadek, Mountainview, CA (US); Joshua Pollack, San Francisco, CA (US); Jeffrey P. Adams, Tyngsborough, MA (US)

(73) Assignee: Rawles LLC, Wilmington, DE (US)

( * ) Notice: Subject to any disclaimer, the term of this patent is extended or adjusted under 35 U.S.C. 154(b) by 349 days.

(21) Appl. No.: 13/534,935

(22) Filed: Jun. 27, 2012
(Under 37 CFR 1.47)

(51) Int. Cl.
*G01S 3/80* (2006.01)

(52) U.S. Cl.
CPC ................................ *G01S 3/8006* (2013.01)

(58) Field of Classification Search
CPC ..................................................... G01S 3/8083
USPC ................................................. 367/129, 125
See application file for complete search history.

(56) References Cited

U.S. PATENT DOCUMENTS

| 3,764,964 | A * | 10/1973 | Seeley et al. ................. 367/125 |
| 6,790,183 | B2 * | 9/2004 | Murphy ........................ 600/532 |
| 2002/0183642 | A1 * | 12/2002 | Murphy ........................ 600/532 |
| 2008/0247274 | A1 * | 10/2008 | Seltzer et al. ................. 367/125 |

FOREIGN PATENT DOCUMENTS

WO     WO2011088053     7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Daniel Pihulic
(74) *Attorney, Agent, or Firm* — Lee & Hayes, PLLC

(57) ABSTRACT

Techniques are described for determining locations of audio sources. Audio signals are captured from multiple locations. Pairs of the audio signals are analyzed to create correlograms, indicating correlation scores corresponding to different time offsets between the signals. Based on the correlograms, various locations are analyzed to determine probabilities of audio originating from those locations. The highest probabilities are found, indicating locations containing audio sources. In some situations, the audio sources may be reflective sources, and the locations of the reflective sources may be used to determine the locations of objects or surfaces.

29 Claims, 4 Drawing Sheets

AUDIO SOURCE LOCALIZATION

BACKGROUND

User interfaces have traditionally relied on input devices such as keyboards, which require physical manipulation by a user. Increasingly, however, it is desired to detect and monitor the physical positions and movements of users and objects within an environment.

In certain situations, it may be desired to determine the locations of one or more audio sources within an environment. Time-of-flight measurements can be used to determine locations of certain types of audio sources. However, time-of-flight calculations depend on knowing the time at which sounds were generated. In many situations, time-of-flight measurements are not possible because it is not possible to determine the origination time of received sounds. However, it may be possible to use "time-of-arrival" or "time-difference-of-arrival" techniques to determine the locations of certain types of audio sources. Time-difference-of-arrival uses microphones at multiple locations to detect arriving audio. Assuming that a discrete event can be detected in the audio, the time of arrival of that event may be compared between different microphones to determine the likely location of the audio source relative to the microphones.

Unfortunately, existing time-difference-of-arrival techniques are primarily suitable for transient or pulse-like sounds, for which a distinctive characteristic of the received audio signal may be reliably identified. Other types of audio, such as human speech and many other sounds, remain difficult to localize.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques for determining location of one or more sounds within an environment. A plurality of microphones are positioned at known locations within the environment and used to concurrently capture audio signals. Correlograms are then calculated for different pairs of the microphones based on the audio signals captured by those microphones. Each correlogram indicates the degree of correlation between the audio signals received by the two microphones over a range of timing shifts between the audio signals. The values of a single correlogram may be used to indicate the probabilities of an audio source existing at various distances relative to the two microphones. Peaks in a particular correlogram may indicate a high probability of an audio source existing at a relative or comparative distance from the two microphones.

Based on the calculated correlograms, an environment may be searched for audio sources. At a particular location within the environment, corresponding correlogram values may be analyzed in combination to indicate the probability of that location containing an audio source. By performing this analysis for multiple locations, a probability map may be created. Such a probability map indicates, for each location of an environment, the probability of that location containing a sound source. The locations of multiple concurrent audio sources may be determined by identifying locations having relatively high probabilities.

The described techniques may also be used to track the positions of users and other sound sources over time. For example, a user's position within a room may be tracked, and updated continuously or at a relatively high rate.

Example Environment

Figure 1:
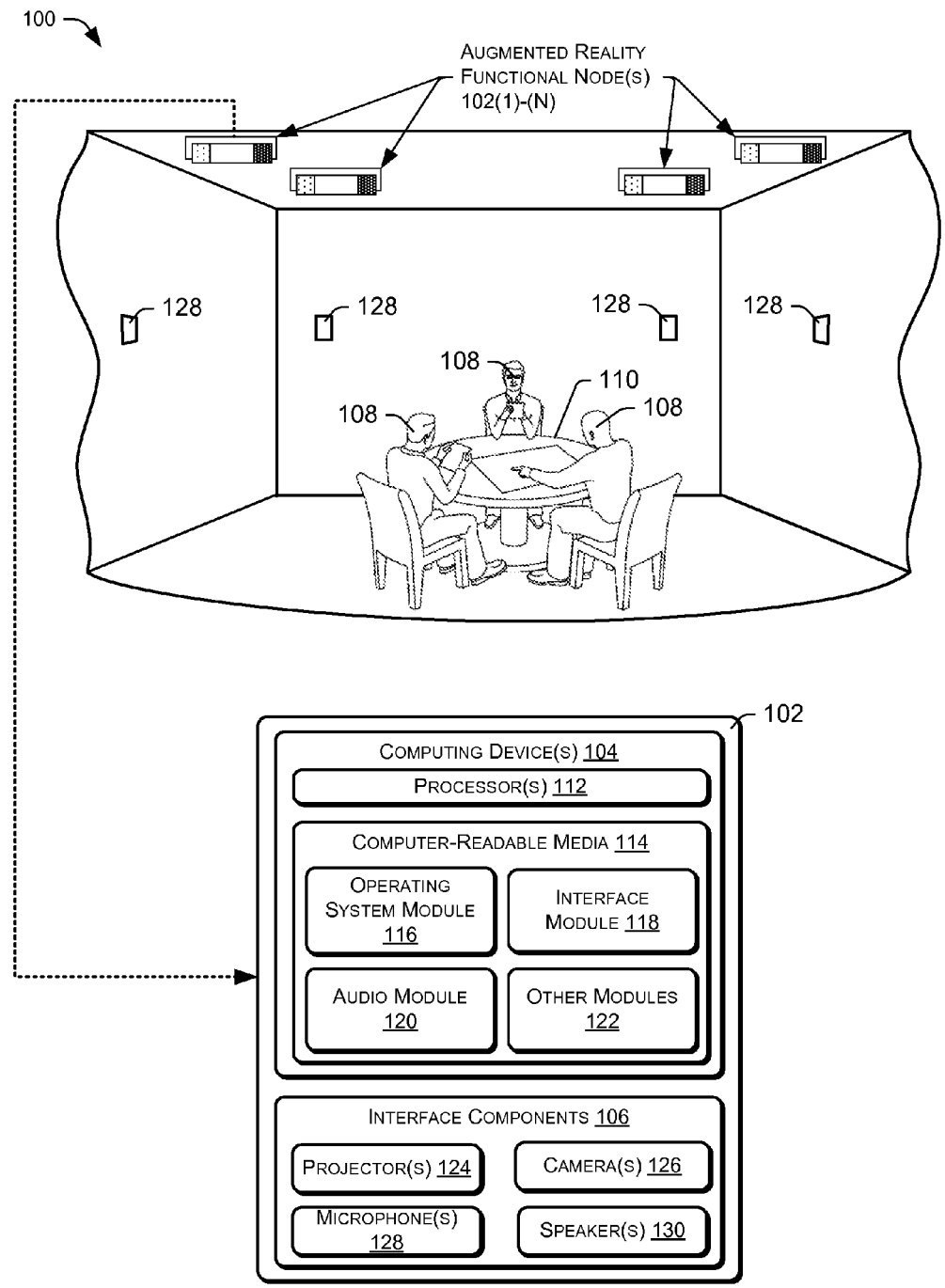
FIG. 1 illustrates an environment that includes an augmented reality functional node (ARFN) that monitors and responds to user activities based in part upon localization of audio sources within the environment.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes positioned at different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more interface components 106. The computing devices 104 and interface components 106 may be configured in conjunction with each other to interact with users 108 within the environment 100. In this example, the users are shown as sitting around a table 110.

As an example of operation, the ARFN may attempt to determine the location of the user or users 108 within the environment, and may attempt to display content on a location that is near the user or users 108, such as on the surface of the table 110. Localization of users and/or of other audio sources within the environment 100 may be performed using the audio localization techniques described below.

As illustrated, the computing device 104 of the example ARFN 102 may include one or more processors 112 and computer-readable media 114. The processor(s) 112 may be configured to execute instructions, which may be stored in the computer-readable media 114 or in other computer-readable media accessible to the processor(s) 112. The processor(s) 112 may include digital signal processors (DSPs), which may be used to process audio signals in accordance with the techniques described below.

The computer-readable media 114 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth that are configured to execute on the processors 112. For instance, the computer-readable media 114 may store an operating system module 116 and an interface module 118.

The operating system module 116 may be configured to manage hardware and services within and coupled to the computing device 104 for the benefit of other modules. The interface module 118 may be configured to receive and interpret commands received from users within the environment 100, and to respond to such commands in various ways as determined by the particular environment.

The computer-readable media 114 may also include an audio module 120 that is executable to perform audio processing. In particular, the audio module 120 may implement the techniques described below for localizing audio sources.

The computer-readable media 114 may contain other modules 122, which may be configured to implement various different functionality of the ARFN 102.

The ARFN 102 may include various interface components 106, such as user interface components and other components that may be used to detect and evaluate conditions and events within the environment 100. As examples, the interface components 106 may include one or more projectors 124, one or more cameras 126, one or more microphones 128, and one or more speakers 130. The interface components 106 may in certain implementations include various other types of sensors and transducers, content generation devices, and so forth.

The projector(s) 124 may be used to project content onto surfaces of the environment 100 for viewing by the users 108. In addition, the projector(s) 124 may project patterns, such as non-visible infrared patterns, that can be detected by the camera(s) 126 and used for 3D reconstruction and modeling of the environment 100.

The camera(s) 126 may be used for various purposes, such as determining the location of the users 108, detecting user gestures, determining the positions of objects within the environment 100, reconstructing 3D characteristics objects within the environment 100, and so forth.

The microphone 128 may be disposed within a chassis of the ARFN 102. In addition, microphones 128 may be located at various known locations within the environment 100, such as on the walls of a room. The microphones 128 may be used to acquire input from the users 108, may be used to aid in the characterization of and receipt of input from the environment 100. The microphones 128 may be situated to facilitate sound localization, such as placing the microphones in distributed locations within the environment 100. For three-dimensional sound localization, the microphones 128 may be positioned spatially in at least two different geometric planes. Three-dimensional sound localization may be accomplished when using four or more microphones, although many environments may be configured with five or more microphones. Single-dimensional or two-dimensional sound localization may be accomplished with fewer numbers of microphones. The speaker(s) 130 may be used by the ARFN 102 to provide audible output. For example, the speaker(s) 130 may be used to provide output from a text-to-speech module or to playback pre-recorded audio. The speakers(s) 130 may also be used to generate reference sounds, which may be useful in detecting objects or surfaces within a room in accordance with techniques that will be described in the following discussion.

The coupling between the computing device 104 and the interface components 106 may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within a projector or camera. Therefore, it is to be appreciated that the illustration of the ARFN 102 of FIG. 1 is for illustrative purposes only, and that components of the ARFN 102 may be configured in any other combination and at any other location.

Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

Source Localization

Figure 2:
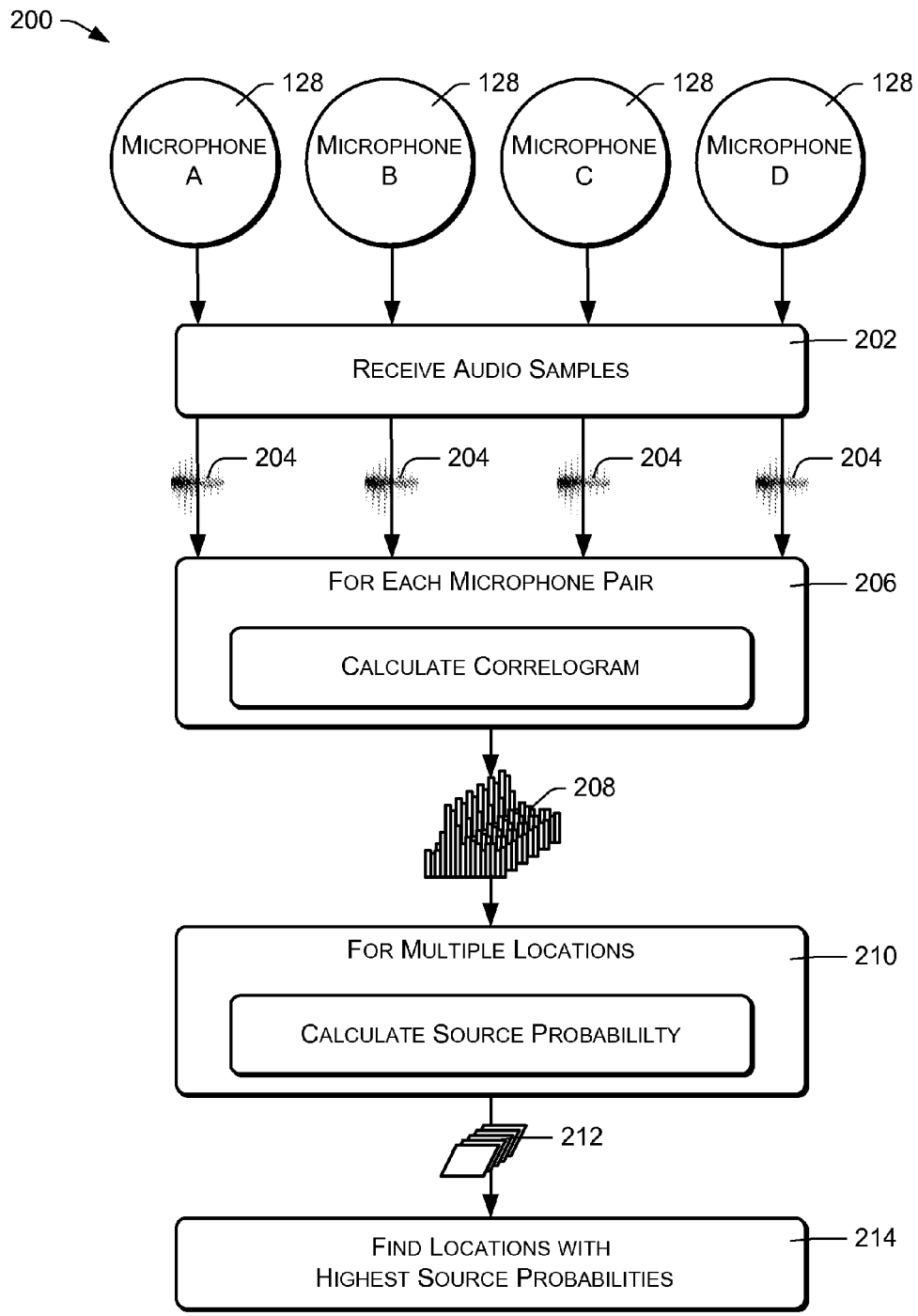
FIG. 2 is a flowchart illustrating an example method of analyzing input from multiple microphones to localize environmental audio sources.

FIG. 2 illustrates an example method 200 of determining the location of an audio source within an environment such as the environment 100 of FIG. 1. The method 200 may also be used to determine the locations or coordinates of multiple audio sources that are producing audio at the same time. For example, multiple human speakers may be localized, even when they are speaking at the same time.

An action 202 comprises receiving audio signals from the microphones 128. An individual audio signal 204 is received from each of the microphones 128. Each signal 204 comprises a sequence of amplitudes or energy values.

An action 206 comprises, for each different pair of two microphones 128, calculating a correlogram 208 based on the audio signals from the pair of microphones. The example of FIG. 2 shows four microphones, labeled A, B, C, and D. Thus, a respective correlogram 208 is calculated for each of the microphone pairs A-B, A-C, A-D, B-C, B-D, and C-D, resulting in six correlograms.

Figure 3:
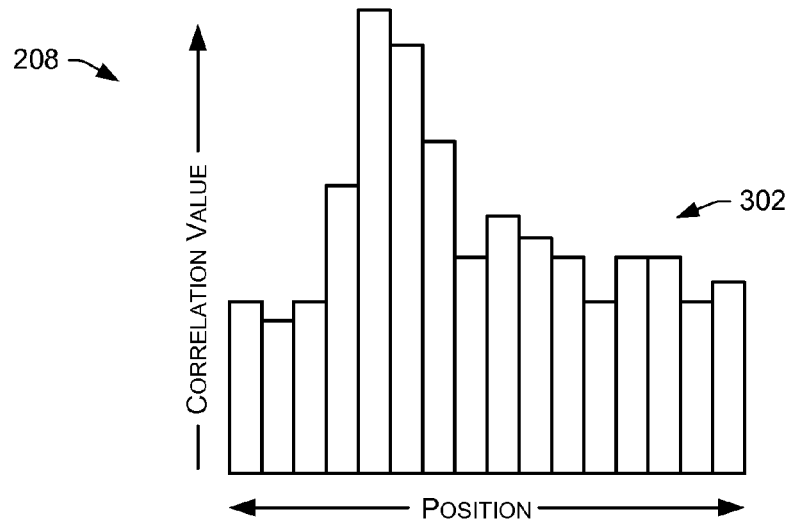
FIG. 3 is an example of a histogram such as might be generated and used by the ARFN to localize audio sources.

FIG. 3 shows an example of a single correlogram 208 calculated from two audio signals received as described above from a pair of two microphones. The correlogram 208 indicates correlation values, scores, or probabilities 302 of the audio signals over a range of timing offsets. Timing offsets are indicated by the horizontal axis. Corresponding correlation scores or probabilities 302 are indicated by the vertical axis.

As an example, the center of the horizontal axis may represent a zero time shift or offset between the two captured audio signals. In other words, the correlation value at the center of the horizontal axis is the result of correlating the two audio samples at their received phases, with no time shifting. Correlation values toward the left or the right of the correlogram 208 represent correlations performed after time shifting the two audio signals relative to each other by various increasing amounts.

The horizontal axis also has a correspondence to relative position between the two microphones. As an example, a high correlation score at the middle of the correlogram 208 may indicate a sound whose source is at the same physical distance from each of the microphones. Locations at the same physical distance from two microphones are defined by a plane that is perpendicular to a line between the two microphones, and that intersects the line at a point halfway between the two microphones.

More generally, each point along the horizontal axis of the correlogram corresponds to a hyperbolic surface that includes those points having a given ratio of distances between the two microphones. At the middle of the correlogram, the hyperbolic surface converges to a plane. At the ends of the correlogram, the hyperbolic surface converges to vectors extending away from the two microphones along the line that is formed by the locations of the two microphones. Thus, a high correlation score toward one end of the correlogram may indicate a sound whose source is relatively closer to one microphone than to the other.

Each point along the horizontal axis corresponds to all potential audio source locations having a particular ratio of distances from the two microphones. Stated alternatively: every potential audio source location within the environment 100 defines a distance ratio based on the distances of the location from the two microphones; this distance ratio corresponds to a single point along the horizontal axis of the correlogram 208; and the correlation score 302 at that single point corresponds to the potential audio source location.

Individual correlation values or scores may be calculated by taking the correlation of the two audio signals at the given time offset. For example, corresponding signal amplitudes may be multiplied and the resulting products summed to form a correlation score. Phase transform (PHAT) correlation may be used. PHAT accounts for phase information in the correlation process and thus may be used to provide a relatively higher degree of separation between different sound sources because it is resilient to noise.

In certain embodiments, the correlograms may be normalized to represent probabilities rather than absolute values. Specifically, each value of a particular correlogram may be divided by the maximum value of the correlogram, resulting in correlogram probabilities ranging from 0 to 1, or from 0% to 100%.

Referring again to FIG. 2, an action 210 comprises calculating or generating source probabilities 212 for multiple potential audio source locations, based at least in part on the signal correlation scores or probabilities of the correlograms. More specifically, the action 210 comprises selecting multiple locations within, throughout, or relative to the environment 100, and calculating probabilities 212 for each of the selected locations. The source probability 212 for a particular location indicates the relative likelihood of an actual audio source existing at that location.

An individual source probability 212, corresponding to a given location, may be based on correlation scores or probabilities from the correlograms 208. Specifically, each correlogram 208 may be referenced to find the correlation score or probability 302 corresponding to the given location. A given correlogram 208, corresponding to a pair of two microphones, is referenced by first determining the ratio of distances between the given location and each of the two microphones. This ratio is then used to determine a location on the horizontal axis of the correlogram 208, and the correlation score or probability 302 from that location is selected as the correlation score corresponding to the given location. Correlation scores from the multiple available correlograms (corresponding to different microphone pairs) are summed, multiplied, or otherwise combined to calculate a source probability 212 corresponding to that location.

The source probabilities 212 may be calculated for multiple points or regions of an environment to create a probability map of the environment. The probability map indicates, for each point within the environment, the probability of that point containing a sound source. The probability map may be calculated at any desired spatial resolution.

Based on the source probabilities 212, an action 214 comprises determining or finding one or more of the potential audio source locations that has relatively high corresponding source probabilities, and concluding that these locations correspond to actual or reflective audio sources. Source probabilities may be evaluated relative to dynamic or predetermined thresholds. In some cases, the action 214 may comprise identifying one or more peaks in the source probabilities. In other cases, the action 214 may comprise identifying the single location having the highest relative source probability. In yet other cases, the action 214 may comprise identifying multiple locations having source probabilities that meet or exceed a predetermined or dynamically calculated threshold.

The described method can be used to detect and determine the position of multiple sound sources within the environment 100, by identifying multiple peaks in the source probability scores.

The described method can be used to detect both actual audio sources and reflective audio sources. A reflective audio source is a virtual or apparent sound source caused by reflected audio. For example, a wall of the environment 100 may case audio reflections or echoes, which may be apparent as virtual audio sources. Such virtual audio sources will be detected by the methods described above as being at locations beyond or behind the surfaces causing the reflections. Because of this, audio reflections can be effectively ignored by limiting the actions 210 and 214 to potential source locations that are inside or within the environment being analyzed. Thus, if the environment 100 is a room, selections of the locations analyzed in the action 210 may be limited to locations within the room.

In some cases, it may be desirable to detect reflected sound in order to determine the locations of reflecting surfaces within an environment. This may be accomplished by performing the actions 210 and 214 with respect to potential source locations outside the environment 100, in order to detect or locate virtual or reflective audio sources. When a virtual audio source is located, it can be assumed that a reflective surface lies midway between the virtual audio source and the actual source of the audio.

Localization of Reflective Surfaces

Figure 4:
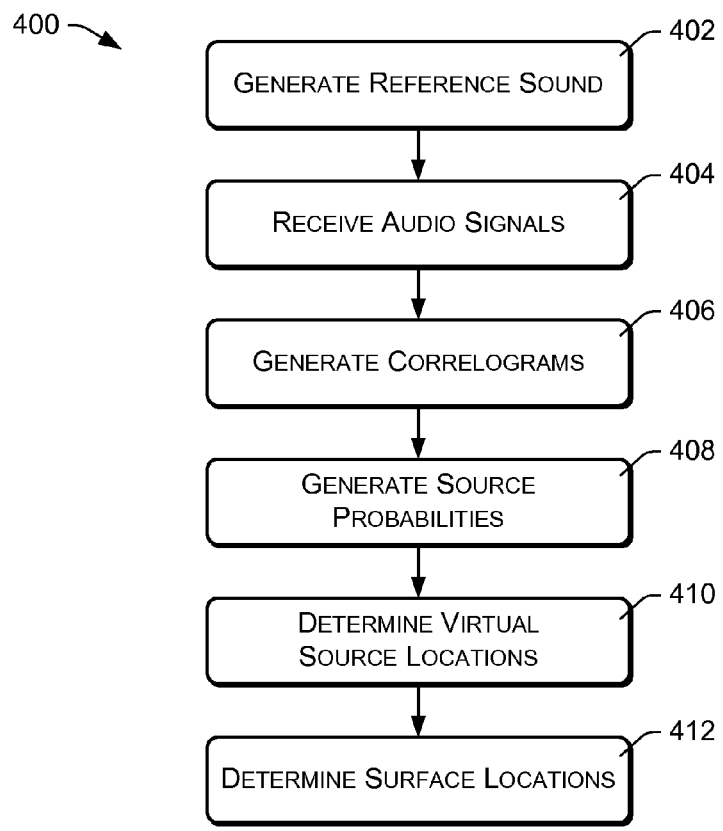
FIG. 4 is a flowchart illustrating an example method of analyzing input from multiple microphones to determine locations of reflecting surfaces of an environment.

FIG. 4 shows an example method 400 that may be used to detect locations of reflecting surfaces or other audio reflectors within an environment. For example, the method 400 may be used to detect the positions of walls or of various objects within a room. The method 400 will be described as being performed within the environment 100 of FIG. 1, although the method may be performed in various types of environments.

An action 402 may comprise generating a reference sound from a reference audio source having a known location within the environment 100. As an example, the reference sound may be generated by one of the speakers 130 housed by one of the ARFNs 102. Alternatively, a speaker may be positioned at another location within the environment 100, such as in the center of the room, and may be used to generate the reference sound.

The position of the reference audio source may be determined by a known configuration, or may be detected dynamically in accordance with the methods already described. In situations in which the reference audio source generates reflections or echoes, the original source of the sound may be identified as the location associated with the first detected instance of that sound, which can be determined by referencing the correlograms described above.

In some cases, the reference sound may be a sound that is not generated under the control of the ARFN 102, such as a sound that occurs independently within the environment 100.

The reference sound itself may comprise a sound that is highly reverberant—likely to generate reflections within the environment 100. Different sound frequencies may be more or less effective for this purpose, depending on characteristics of the environment 100.

An action 404 may comprise receiving audio signals from multiple locations as described above, such as by using the microphones 128. An action 406 may comprise generating correlograms or correlogram data corresponding to different respective pairs of the audio samples, again as described above. An action 408 may comprise generating source probabilities for multiple potential locations, based at least in part on the generated correlograms. In this case, however, the analyzed potential locations comprise locations outside of the environment 100.

An action 410 may comprise determining the locations of one or more virtual or reflective sound sources based at least in part on the generated probabilities. Similar to the situation previously described, locations outside the environment having relatively high source probabilities are found and identified as locations that likely represent virtual or reflective sound sources. An action 412 may comprise determining the positions of reflective objects or surfaces based on the determined positions of virtual or reflective sound sources. The existence of a virtual sound source at a determined location outside the environment implies a reflective surface at a point midway between the reference audio source and the determined location.

In some cases, the potential locations analyzed by the actions 408 and 410 may be limited to locations selected within a horizontal plane of the environment 100, in order to reduce computational overhead. Performing these actions with respect to a horizontal plane is sufficient to identify vertical walls within an environment. In other cases, computations may be limited to locations within one or more vertical planes of the environment, within planes of other orientations, or within other types of geometric surfaces.

The methods illustrated by FIG. 2 and FIG. 4 may be performed repetitively, at increasing levels of spatial resolution, in order to reduce the number of calculations needed when localizing audio sources. For example, the correlograms of the action 206 may be initially calculated at a relatively coarse spatial resolution. Similarly, the multiple locations 210 may be initially selected at a relatively coarse spatial resolution throughout an environment, in order to identify a general area in which an audio source may be located. A subsequent iteration of these actions may be performed at a higher spatial resolution, while limiting the calculations to those that are relevant to the general area identified by the initial iteration.

As a more specific example, the action 210 of FIG. 2 may be performed multiple times, at increasing levels of resolution. In a first iteration, the action 210 may calculate source probabilities for large regions of a room. For example, source probabilities may be calculated for quadrants of the room, to determine which of the quadrants is most likely to contain a sound source. Upon identifying a specific quadrant, that quadrant may be further divided into sub-quadrants; probabilities may be calculated for each of those sub-quadrants; and the sub-quadrant having the highest source probability may be identified. This process may be repeated with increasingly smaller quadrant sizes until reaching a desired resolution.

The source probability for a given region, such as a quadrant, may be calculated in various ways. In certain embodiments, correlograms may be calculated at a relatively fine level of resolution in the action 206. When calculating the source probability for a region, in the action 210, multiple correlogram scores for that region may be summed to generate a probability for the region. Alternatively, the correlograms may initially be calculated at a very coarse level of resolution, used for calculating probabilities of large regions, and then the correlograms may be recalculated at increasingly smaller levels of resolution in order to calculate source probabilities for increasingly smaller regions.

In some embodiments, correlograms may be calculated at a given resolution, and the source probabilities may be calculated at smaller levels of resolution by interpolating between the correlogram scores.

Historical Localizations

Figure 5:
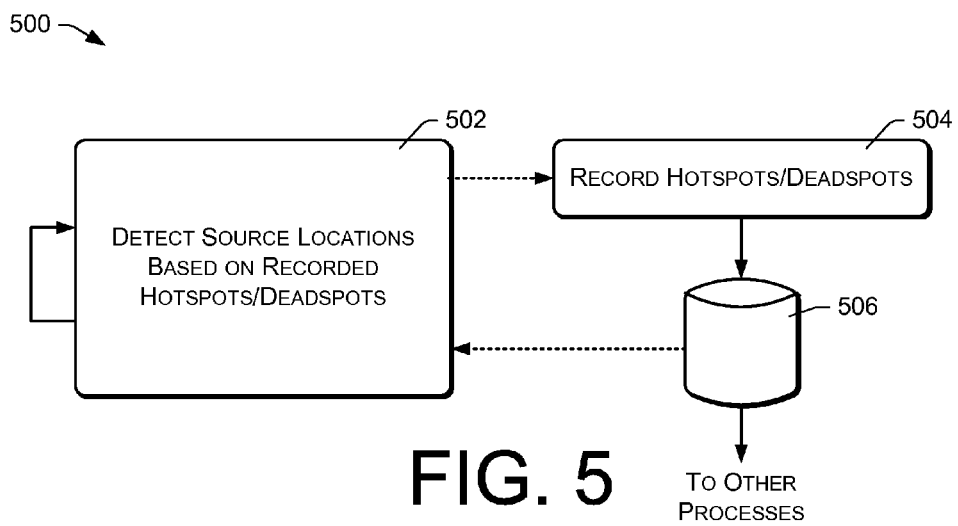
FIG. 5 is a flowchart illustrating an example method of localizing audio sources based on historical observations of audio sources.

FIG. 5 illustrates an example method 500 of recording audio activity within an environment and of optimizing audio localization based on past observations of audio activity. The method 500 may be performed in the environment 100 of FIG. 1 or in other environments.

An action 502 comprises detecting the locations of audio sources, generally as described above with reference to FIG. 2. The action 502 may be performed repetitively, to detect the locations of various audio sources, and to localize audio sources as they move within the environment.

An action 504, performed in conjunction or in response to iterations of the action 502, comprises recording the locations of hot spots and/or dead spots within the environment 100. A hot spot may be a location or area in which frequent audio activity has been observed. A dead spot may be a location or area in which audio activity is only infrequently observed. These locations or areas may be recorded to a database or repository 506 for future reference.

As the action 502 is repeated, method parameters may be optimized to emphasize or focus on areas corresponding to hot spots, and to deemphasize or avoid analyzing areas corresponding to dead spots. Thus, the action 502 may be informed by the hot spots and dead spots indicated by the repository 506. As an example, the potential locations that are the subject of the action 210 and 214 of FIG. 2 may be limited to areas corresponding to hot spots.

In addition, other processes or tasks performed by the ARFN 102 may be responsive to the observations stored by the repository 506. For example, the ARFN 102 may use beam forming techniques to concentrate on certain areas and/or to ignore certain areas of an environment, based on past observations regarding locations of audio activity and the types of audio activities observed at those locations. For example, the techniques described above may be used to detect comparative delay times corresponding to a particular sound source location, and those delay times may be used for tuning beam forming microphone arrays.

Figure 6:
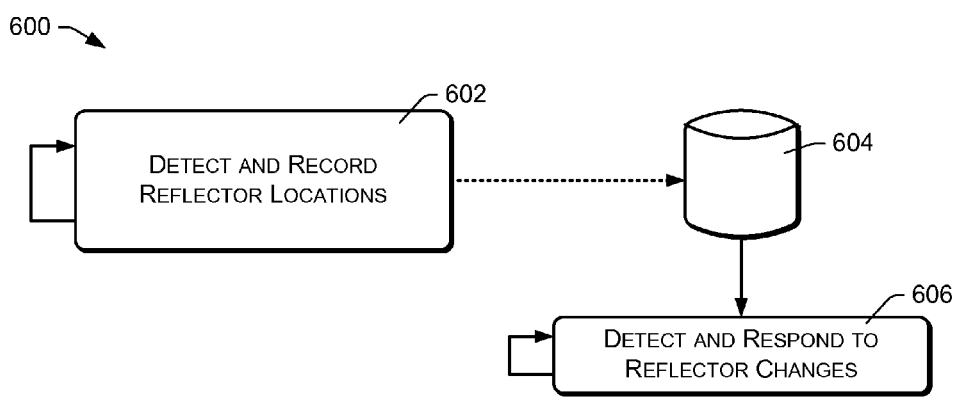
FIG. 6 is a flowchart illustrating an example method of detecting environmental changes based on historical observations of audio sources.

FIG. 6 shows an example method 600 of detecting and responding to the locations of various types of audio reflectors within an environment. The method 600 may be performed in the environment 100 of FIG. 1 or in other environments.

An action 602 comprises detecting the locations of reflective surfaces and objects within the environment 100, generally as described above with reference to FIG. 4. Reflections and reflective surfaces may indicate presence of various objects within a room, and such objects may be identifiable by the ARFN 102 using acoustic analysis or other techniques available to the ARFN such as optical recognition techniques. The nature and locations of the reflective objects may be recorded to a database or data repository 604.

An action 606, which may be performed repetitively, may comprise detecting and responding to changes of reflective surfaces within the environment 100, based on data stored by the action 602 in the repository 604. For example, continued observation of the environment 100 may at some time reveal the presence of a new audio reflector, which upon further analysis may be identified as a couch. Alternatively, ongoing iterations of the action 602 may indicate the removal or replacement of the couch.

The action 606 may include responding to environmental changes in various ways. For example, the removal of a couch from the environment may imply that the user of the environment 100 may have need of a new couch, and the ARFN may respond by creating customized offers for the user.

As another example, the described techniques may allow determining the locations of users within an environment, and to detect halls, walkways, and other characteristics of the environment based on the spaces where users are located.

In some embodiments, the described techniques may be used to determine the height of users, and might therefore facilitate user identification based on height. Alternatively, upon detecting the position of a user, an identification of the user may be facilitated by using other available sensing devices, such as cameras, to perform further inspection at the detected position.

Upon identifying particular users, different actions may be taken based on their identities. For example, different speech models may be used for different users.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system for determining a probable location of a user within an environment, the system comprising:
   one or more processors;
   a plurality of microphones;
   one or more computer-readable media storing computer-executable instructions that, when executed by the one or more processors, cause the one or more processors to perform acts comprising:
      receiving an audio signal, representative of an utterance of the user, from each of the plurality of microphones;
      generating correlogram data for different pairs of the audio signals, wherein the correlogram data for a particular pair of the audio signals comprises correlation scores of the particular pair of the audio signals over a range of audio signal timing offsets;
      generating a source probability for each of multiple potential locations of the user based at least in part on the correlation scores of the correlogram data; and
      determining the probable location of the user based at least in part on the generated source probabilities.

2. The system of claim 1, wherein generating the source probabilities and determining the probable location of the user are performed repetitively to identify increasingly smaller regions corresponding to the probable location of the user.

3. The system of claim 1, wherein determining the probable location of the user comprises identifying a peak source probability among the generated source probabilities.

4. The system of claim 1, wherein the signal correlation scores are calculated using a phase transform (PHAT) correlation.

5. The system of claim 1, wherein generating the source probability for a particular potential location of the user comprises identifying correlation scores from the correlogram data corresponding to the particular potential location of the user.

6. The system of claim 1, wherein generating the source probability for a particular potential location of the user comprises summing correlation scores from the correlogram data corresponding to the particular potential location of the user.

7. The system of claim 1, the acts further comprising determining multiple probable locations of the user based at least in part on the generated source probabilities.

8. The system of claim 1, the acts further comprising selecting the potential locations of the user based at least in part on a history of determined actual locations of the user.

9. The system of claim 1, the acts further comprising detecting changes in locations of the user in the environment based at least in part on a history of determined actual locations of the user.

10. A method for determining a probable location of an audio source within an environment, comprising:
   receiving an audio signal from each of multiple sensing locations, each of the multiple sensing locations acquiring the audio signal from air within the environment;
   generating correlogram data corresponding to one or more pairs of the audio signals;
   generating a source probability for each of multiple potential audio source locations based at least in part on the generated correlogram data; and
   determining the probable location of the audio source within the environment based at least in part on the generated source probabilities.

11. The method of claim 10, wherein the audio source comprises a reflective audio source.

12. The method of claim 10, wherein generating correlogram data corresponding to a particular pair of the audio signals comprises correlating the particular pair of the audio signals over a range of timing offsets.

13. The method of claim 10, wherein generating correlogram data corresponding to a particular pair of the audio signals comprises correlating the particular pair of the audio signals using a phase transform (PHAT) over a range of timing offsets.

14. The method of claim 10, further comprising determining probable locations of multiple audio sources based at least in part on the generated source probabilities.

15. The method of claim 10, wherein:
   the correlogram data comprises correlation scores; and
   generating the source probability for a particular potential audio source location comprises identifying correlation scores corresponding to the particular potential audio source location.

16. The method of claim 10, wherein:
   the correlogram data comprises correlation scores; and
   generating the source probability for a particular potential audio source location comprises summing correlation scores corresponding to the particular potential audio source location.

17. The method of claim 10, further comprising selecting the potential audio source locations from locations that are outside the environment to determine probable locations of one or more reflective audio surfaces.

18. The method of claim 10, further comprising selecting the potential audio source locations based at least in part on a history of determined probable audio source locations.

19. The method of claim 10, further comprising detecting changes in the environment based at least in part on a history of determined probable audio source locations.

20. A method of surface detection within an environment, comprising:
   receiving an audio signal from each of multiple sensing locations positioned within the environment, the audio signal corresponding to audio captured by each of the multiple sensing locations though air within the environment;
   generating correlogram data corresponding to one or more pairs of the audio signals;
   generating a source probability for each of multiple potential source locations based at least in part on the generated correlogram data;
   selecting a source location based at least in part on the generated probabilities; and
   determining a probable location of a surface within the environment based at least in part on the selected source location.

21. The method of claim 20, further comprising:
   generating a reference sound from a known location within the environment, wherein the environment has a surface that reflects the reference sound; and
   selecting the potential audio source locations from locations that are outside the environment.

22. The method of claim 20, further comprising generating a reference sound to reflect from the surface.

23. The method of claim 20, further comprising generating a reference sound from a known location to reflect from the surface.

24. The method of claim 20, further comprising selecting the source location from locations that are outside the environment.

25. The method of claim 20, wherein the selecting comprises identifying a peak value among the generated source probabilities.

26. The method of claim 20, wherein generating an individual correlogram corresponding to a particular pair of the audio signals comprises correlating the particular pair of the audio samples over a range of timing offsets.

27. The method of claim 20, further comprising:
   selecting multiple source locations based at least in part on the generated probabilities; and
   determining locations of multiple potential reflecting surfaces based at least in part on the selected source locations.

28. The method of claim 27, further comprising selecting the multiple potential reflecting locations from a horizontal plane.

29. The method of claim 20, wherein:
   the correlogram data comprises correlation scores; and
   generating the source probability for a particular potential source location comprises identifying correlation scores corresponding to the particular potential source location.

* * * * *